(12) United States Patent
Liu (10) Patent No.: US 6,290,028 B1
(45) Date of Patent: Sep. 18, 2001

(54) BIKE BRAKE

(76) Inventor: Jen-Chih Liu, 2F., No. 468 Chien Kuo 1 Road, Kaohsiung (TW)

(*) Notice: Subject to any disclaimer, the term of this patent is extended or adjusted under 35 U.S.C. 154(b) by 0 days.

(21) Appl. No.: 09/568,792

(22) Filed: May 9, 2000

(51) Int. Cl.[7] .............................. B62L 5/00; F16D 51/00
(52) U.S. Cl. .................... 188/26; 188/24.14; 188/323; 188/342
(58) Field of Search .................. 188/24.11, 24.14, 188/24.17, 26, 74, 323, 327, 78, 79, 325, 334, 342, 343, 72.9; 192/12 R, 17 R; 74/388 R (56) References Cited

U.S. PATENT DOCUMENTS

| | | | |
|---|---|---|---|
| 762,302 | * | 6/1904 | Gerstner ................................ 188/334 |
| 1,575,426 | * | 3/1926 | Harry ..................................... 188/78 |
| 1,908,228 | * | 5/1933 | Dotson .................................. 188/323 |
| 1,985,406 | * | 12/1934 | Galkin .................................. 192/12 R |
| 2,685,944 | * | 8/1954 | Faucher et al. ........................ 188/74 |
| 2,858,675 | * | 11/1958 | Schneider ............................. 192/12 R |
| 5,524,734 | * | 6/1996 | Hanada ................................. 188/26 |
| 5,673,773 | * | 10/1997 | Lai ....................................... 188/24.17 |
| 5,988,325 | * | 11/1999 | Matsueda ............................. 188/26 |

* cited by examiner

Primary Examiner—Robert J. Oberleitner
Assistant Examiner—Thomas J. Williams
(74) Attorney, Agent, or Firm—Pro-Techtor International Services (57) ABSTRACT

A bike brake has two stages of braking, including a brake drum, a drum cap, plural brake bands and a stopping structure in the brake drum and the drum cap. The stopping structure has a separator, an interactive device, plural springs, plural stopping devices able to be pushed upward and outward by the springs. In case the stopping structure is rotated to alter its angle, the stopping devices are moved upward and outward by the springs to move the stopping devices outward push the brake bands to contact and rub against the inner wall of the brake drum to perform a first stage of baking. If the stopping structure continues to alter the angle larger and larger, the springs shrink and the stopping devices also move down to rest on the stop plates to perform a second stage of strong braking.

1 Claim, 9 Drawing Sheets

BIKE BRAKE

BACKGROUND OF THE INVENTION

This invention relates to a bike brake, particularly to one having two stages of braking action, preventing danger possibly caused by instant braking to stop a bike abruptly.

Conventional bike brakes are generally using a brake line to pull brake bands in a brake drum to move outward to contact and rub against an inner wall of the brake drum to stop a wheel of a bike. However, an instant braking to stop a bike suddenly by users' customary action or an reaction to an unexpected condition may often happen, causing the wheel to slide forward, or falling down of a user or a bike. In automobiles there are a preventing system of sudden stop by instant braking, but in bikes this kind of system have not been disclosed yet so far. There are some patent documents such as U.S. Pat. No. 5,810,139, and Taiwan Patent of No. 89008 titled "Drum brake for bikes". And that of No. 84229 titled "Bike drum brake" are all developed about a brake and the related components, but nothing about an art of preventing instant stopping of braking.

SUMMARY OF THE INVENTION

One purpose of the invention is to offer a bike brake with two stages of braking action to prevent danger caused by instant stop of a bike.

Another purpose of the invention is to offer a bike brake having a first stage of braking action in case of not urgent need.

One more purpose of the invention is to offer a bike brake (especially a front wheel brake) provided with a first stage of braking and a second stage of braking so as to make braking very safe whether in a normal or an urgent condition, preventing possible danger of instant stop of a bike.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
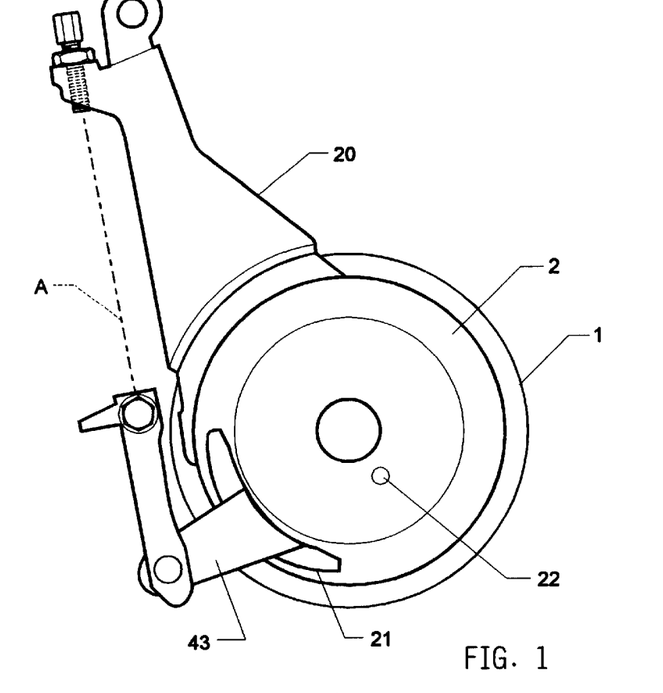
FIG. 1 is a perspective view of a bike brake in the present invention.
Figure 2:
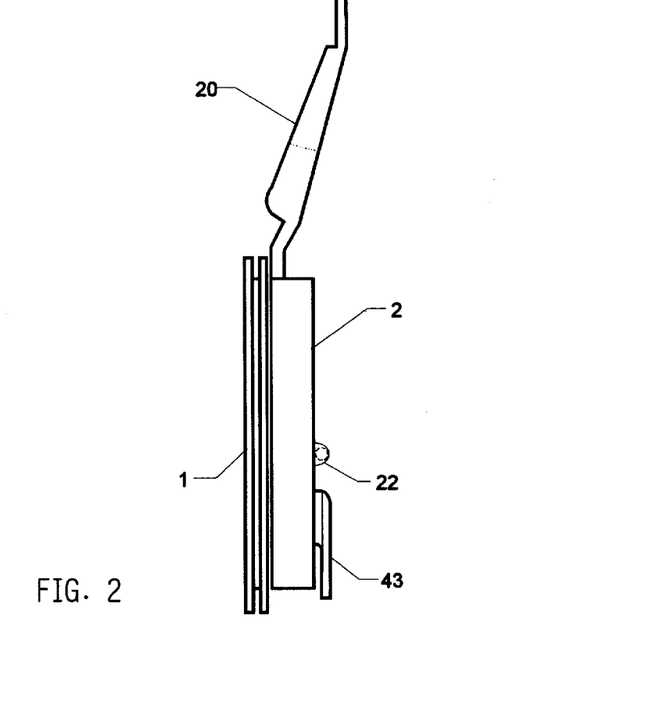
FIG. 2 is a right side view of FIG. 1.
Figure 22:
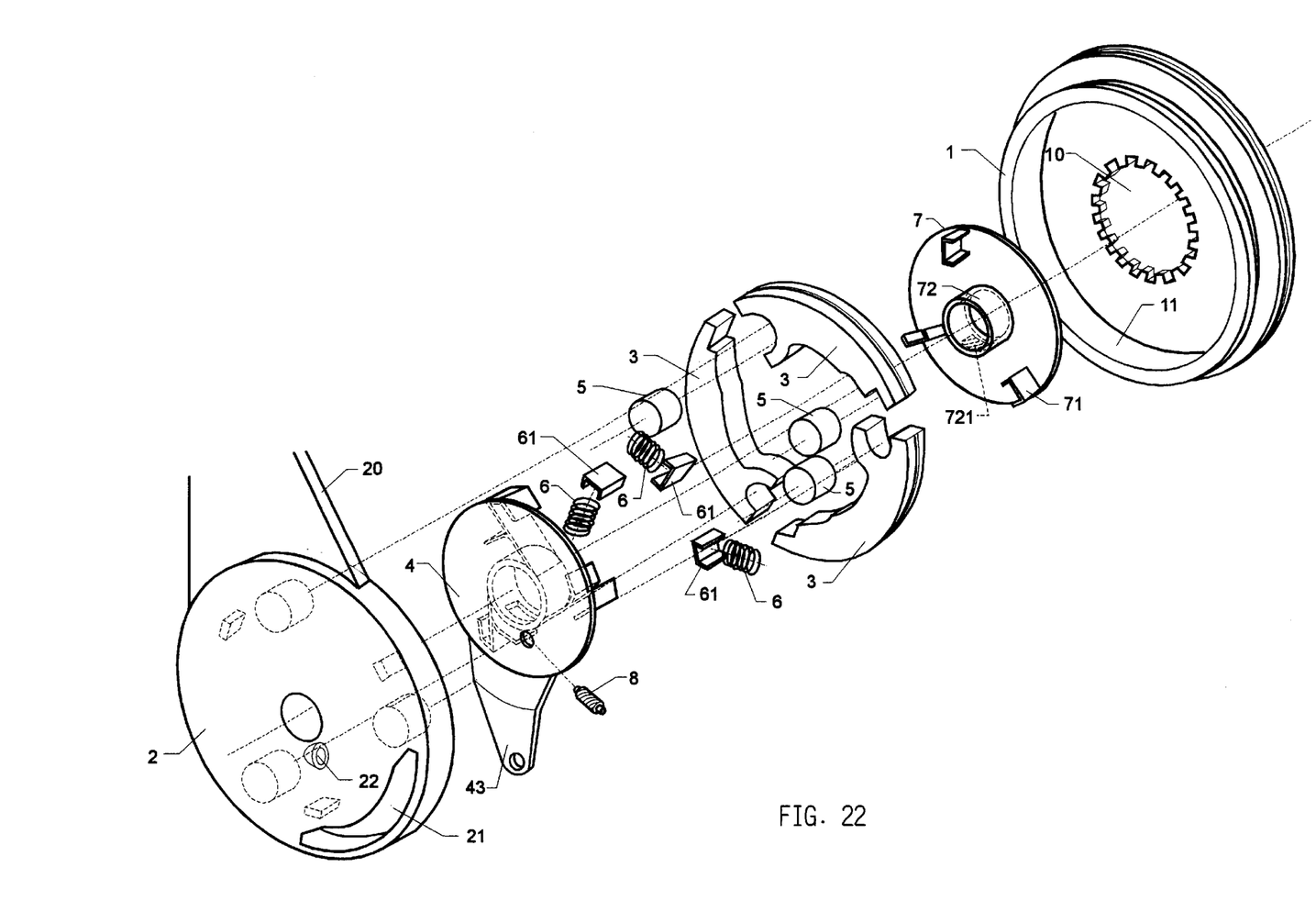

A preferred embodiment of a bike brake in the present invention, as shown in FIGS. 22, 1 and 2, includes a brake drum 1 combined with a wheel shaft, a drum cap 2 with a brake arm 20 fixed on a frame, a stopping structure and plural brake bands 3 contained in the brake drum 1 and the drum cap 2, and the stopping structure consisting of a separator 4 (shown in FIGS. 11 and 12), plural stopping means 5, plural springs 6, an interactive means 7 and an angle set bolt 8.

Figure 3:
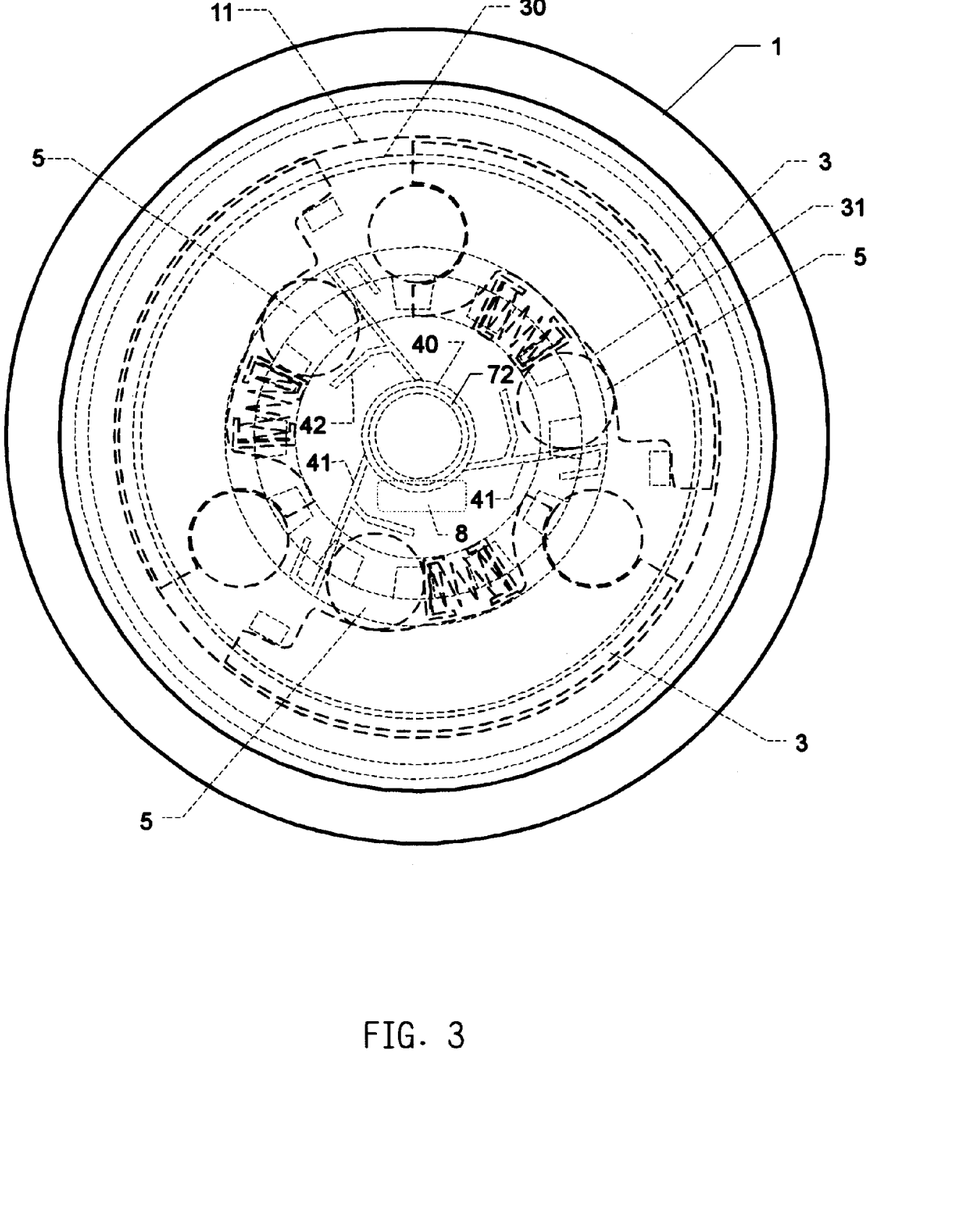
FIG. 3 is a cross-sectional view of a braking structure in the present invention.
Figure 4:
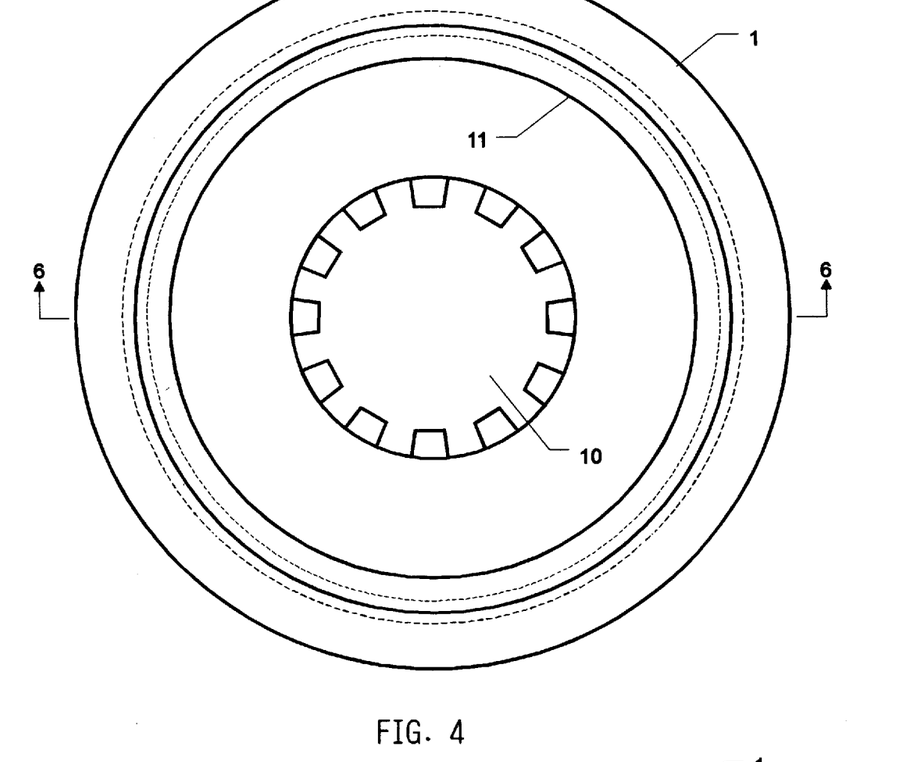
FIG. 4 is a front view of a brake drum in the present invention.
Figure 5:
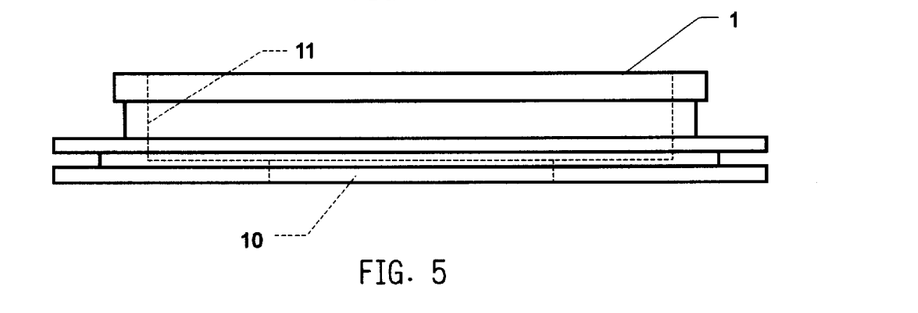
FIG. 5 is an upper view of FIG. 4.
Figure 6:
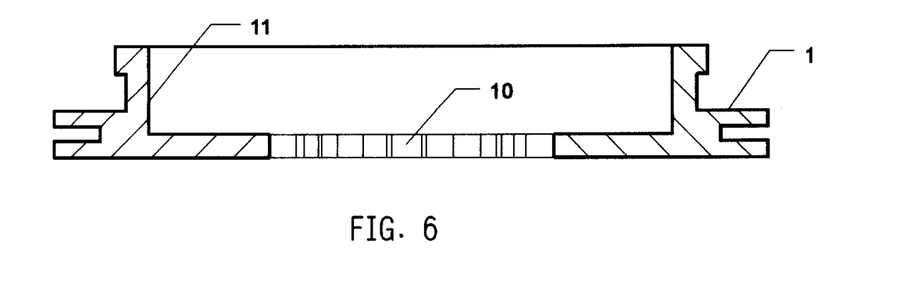
FIG. 6 is a cross-sectional view of the line 6—6 in FIG. 4.
Figure 7:
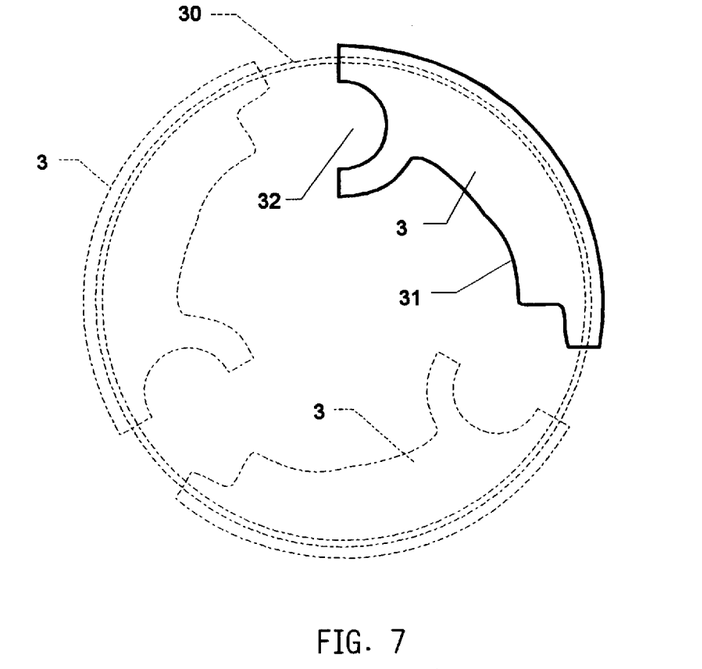
FIG. 7 is a front view of a fixing condition of brake bands in the present invention.
Figure 8:
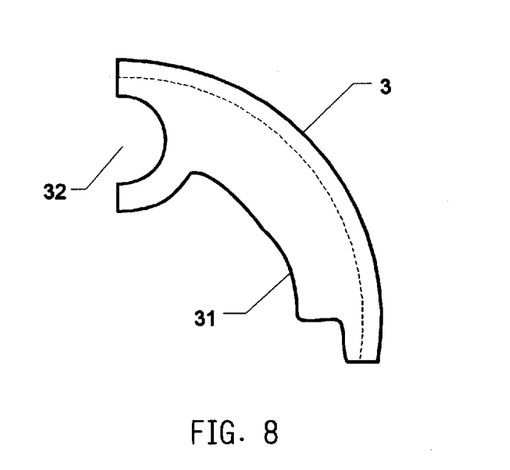
FIG. 8 is a front view of a brake band in the present invention.
Figure 9:
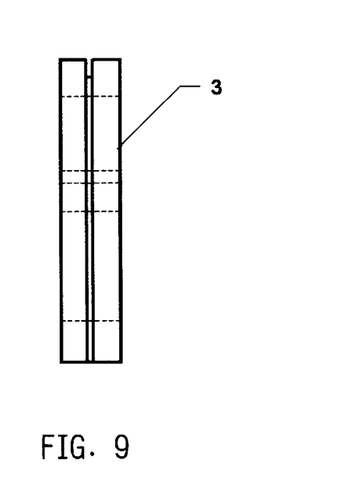
FIG. 9 is a right side view of FIG. 8.
Figure 10:
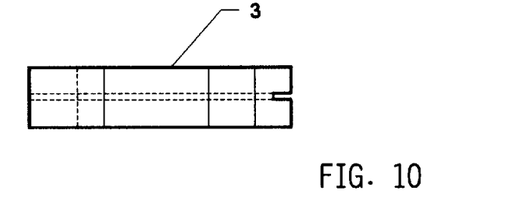
FIG. 10 is an upper view of FIG. 8.
Figure 18:
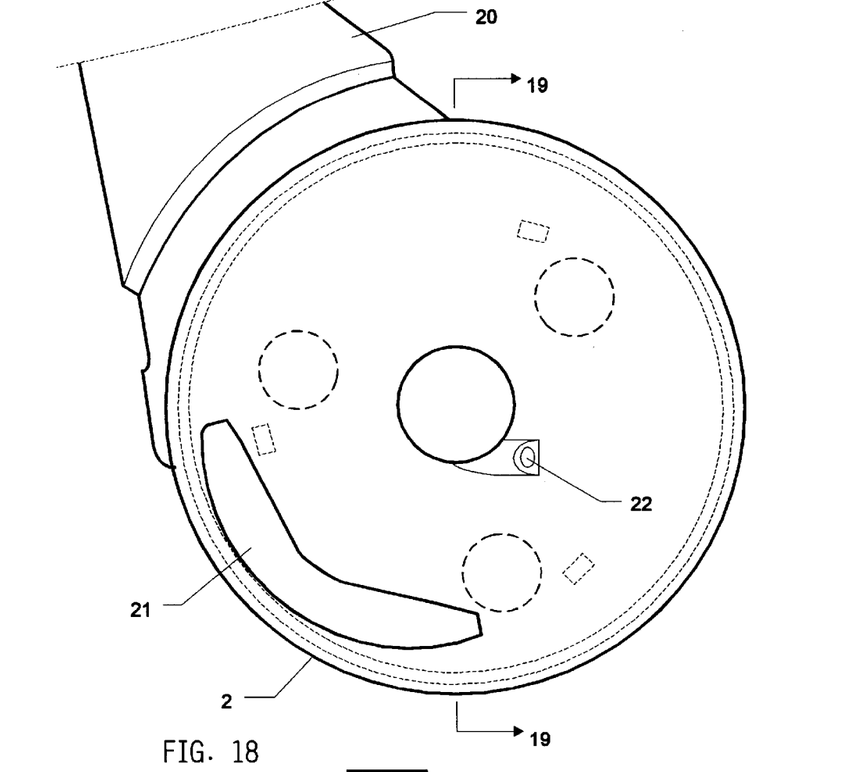
FIG. 18 is a front view of a drum cap in the present invention.
Figure 19:
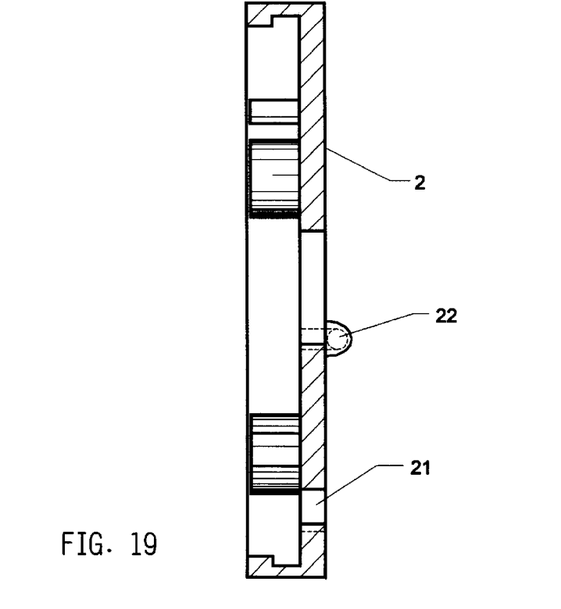
FIG. 19 is a cross-sectional view of the line 19—19 in FIG. 18.

The brake drum 1 shown in FIGS. 4, 5 and 6 has a central hole 10 engaging a wheel shaft, and an inner annular wall 11 for the brake bands 3 to contact and rub against. The drum cap 2 as shown in FIGS. 18 and 19 has a curved slot 21 near the circumferential edge for a coactive arm 43 of the separator 4 to extend through out to connect to a brake line A. The plural brake bands 3 are surrounded by an elastic ring 30 preventing the brake bands 3 from contacting the inner annular wall 11 of the brake drum 1, as shown in FIG. 3. Each brake band 3 has a recess 32 in a front end and a curved surface 31 formed in a lower edge of a rear portion and not parallel with the outer edge for each stopping means 5 to rest on and move along to produce a different stopping effect, as shown in FIGS. 7, 8, 9 and 10.

Figure 11:
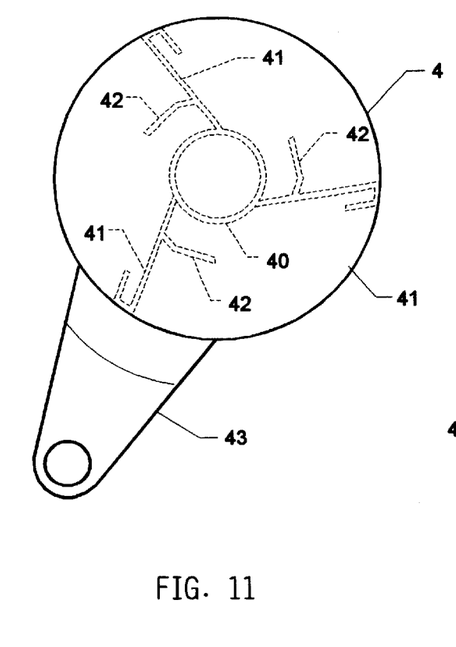
FIG. 11 a front view of a separator in the present invention.
Figure 12:
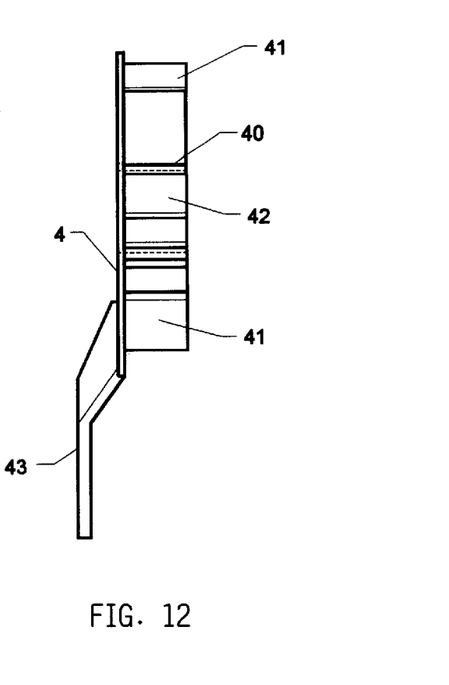
FIG. 12 is right side view of FIG. 11.

The stopping structure shown in FIGS. 3 and 22 has two stages of braking action by means of the brake bands 3 contacting the inner annular wall 11 of the brake drum 1, including a separator 4 of a plate shape as shown in FIGS. 11 and 12 and having plural separating walls 41 and a cylindrical shaft 40 in the center on a rear surface. Then each separating wall 41 has a stop plate 42 extending laterally for each stopping means 5 to rest on in case of the second stage of braking. Further, the separator 4 has an coactive arm 43 extending out of a side and connected to the brake line A to be pulled to move, and an angle setting-bolt 8 engaging a toothed surface 721 on a cylindrical shaft 72 of the interactive means 7 so as to adjust the angle between the interactive means 7 and separator 4. Then the gaps between each end cap 71 of the interactive means 7 and each separating wall 41 have a different angle for the springs between them may produce different elastic forces. The angle-setting bolt 8 can be adjusted through the adjusting hole 22 of the drum cap 2.

Figure 13:
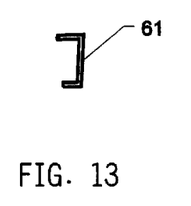
FIG. 13 is a side view of an end cap for a spring in the present invention.
Figure 14:
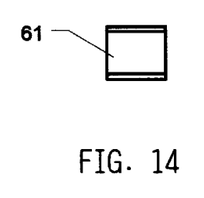
FIG. 14 is a left side view of FIG. 13.
Figure 15:
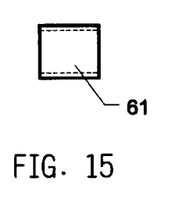
FIG. 15 is a right side view of FIG. 13.
Figure 20:
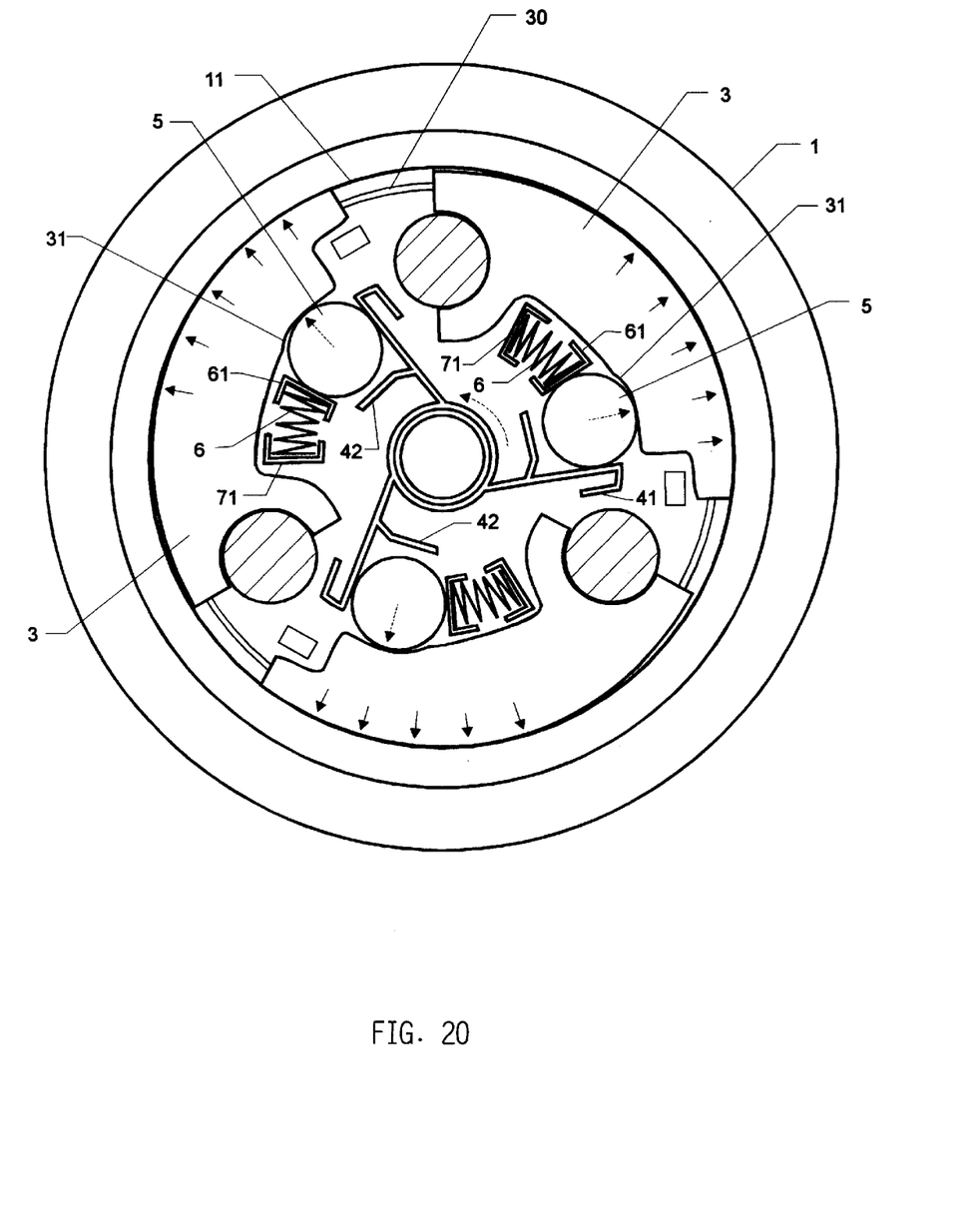
FIG. 20 is a front view of a first stage of braking of the related components in the present invention.
Figure 21:
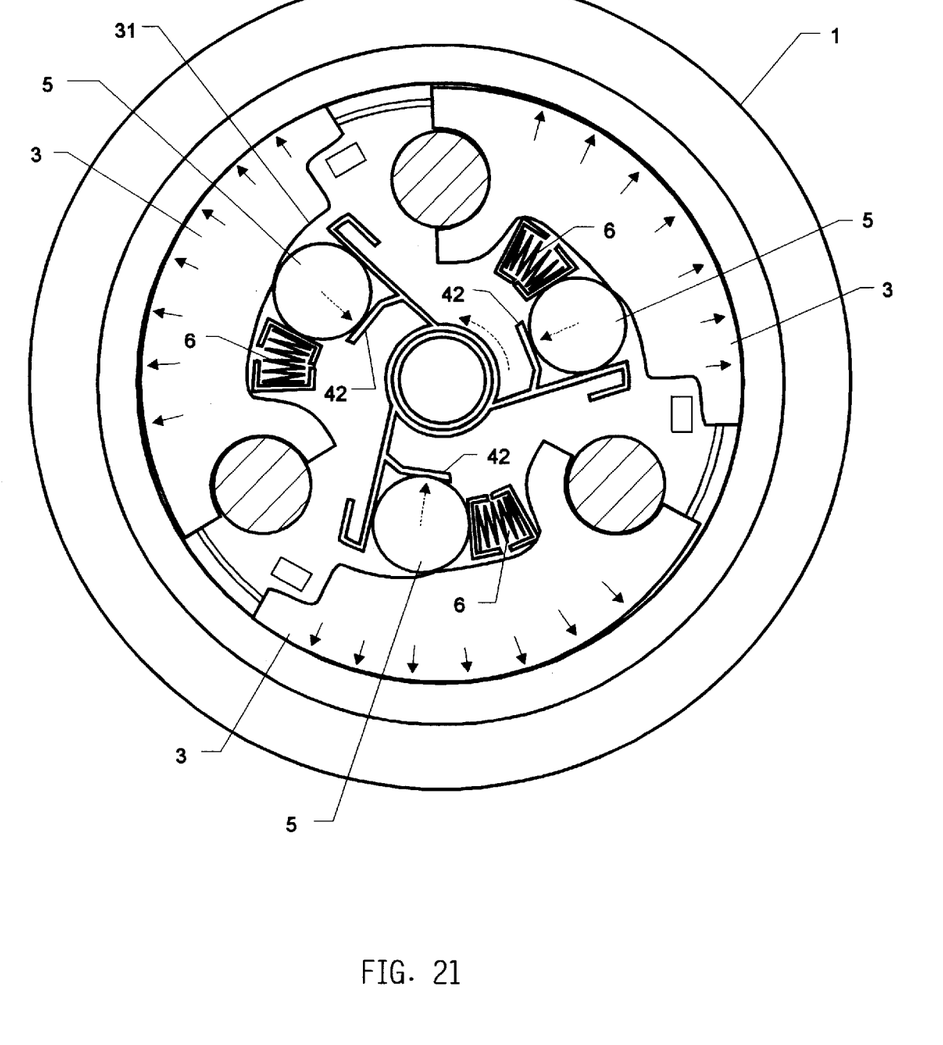
FIG. 21 is a front view of a second stage of braking of the related components in the present invention; and, FIG. 22 an exploded perspective view of the bike brake in the present invention.

The stopping means 5 are a round ball or a column having a round cross-section, placed between each stop plate 42 and each brake band 3, as shown in FIGS. 3, 20 and 21, possible to be pushed to move upward and outward by each spring 6, which has one end resting in each end cap 71 of the interactive means 7 and the other end fitting in another end cap 61 moving in a definite route and contacting the stopping means 5, as shown in FIGS. 13, 14 and 15.

Figure 16:
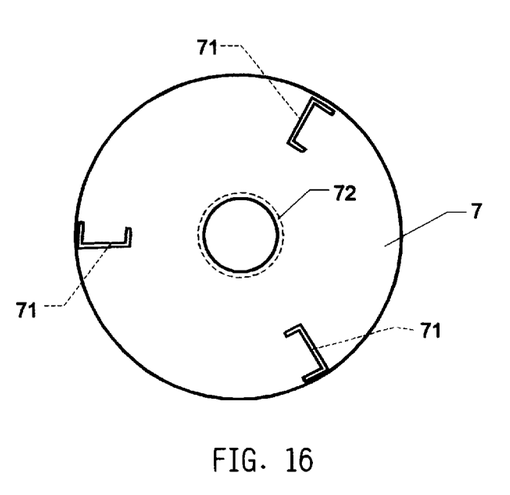
FIG. 16 is a front view of an interactive member in the present invention.
Figure 17:
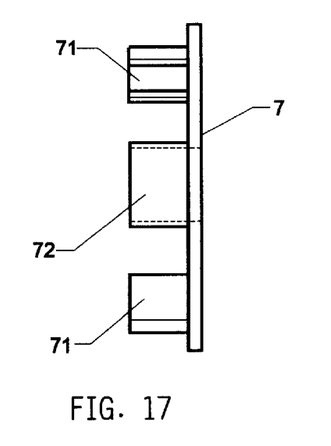
FIG. 17 is a right side view of FIG. 16.

The interactive means 7 shown in FIGS. 16 and 17 has plural end caps 71 respectively for one end of each spring 6 to rest on, and a cylindrical shaft 72 in the center to fit in the cylindrical shaft 40 of the separator 4. The cylindrical shaft 72 has a toothed surface to engage the angle setting bolt 8 fixed on the separator 4 combined with the separator 4 as integral.

Next, as shown in FIG. 20, when the brake is triggered by handling the braking line, the separator 4 begins to turn to alter its angle, all the stopping means 5 are moved respectively along the curved surfaces of the braking bands 3, and pushed by the springs 6 to move upward and outward to push the brake bands 3, which then contact and rub against the inner annular wall 11 of the brake drum 1 to perform the first stage of braking action.

In case the braking is continued, the separator 4 continues to alter its angle larger and larger so that reaction between the stopping means 5 and the braking bands 3 may become larger than the set elastic force of the springs 6, which are then pushed back to let the stopping means 5 move down and inward as shown in FIG. 21 (at this position it is the first stage of braking), and the stopping means 5 finally stopped by the stop plates 42, no more able to retreat. Then the stopping means 5 and the braking bands 3 produce the second stage of strong braking.

The bike brake in the invention has the following advantages as can be understood from the foresaid description.

1. It has the two stages of braking, preventing a bike from stopping abruptly, keeping the braking safer than the conventional ones.
2. It removes surely sudden stop of a bike by instant braking, sliding of the wheel of the bike, or danger of falling of a rider or the bike.
3. The quality and safe effect of the brake is enhanced.

While the preferred embodiment of the invention has been described above, it will be recognized and understood that various modifications may be made therein, and the appended claims are intended to cover all such modifications that may fall within the spirit and scope of the invention.

I claim:

1. A bike brake comprising a brake drum combined with a wheel shaft, a drum cap fixed on a frame of a bike and closed on said brake drum, plural brake bands and a braking structure contained in said brake drum and said drum cap; said brake bands respectively having a curved recess in a front end and a curved surface formed in a lower edge of a rear portion, said curved surface not parallel to an outer edge of said brake band; said stopping structure having plural stopping means, plural springs respectively able to push each said stopping means upward and outward to let each said stopping means rest on said curved surface of each said brake band, said stopping means pushed upward and outward by said springs to move said brake bands outward to contact and rub against said inner annular wall of said brake drum to produce a first stage of braking action when said stopping structure is operated to turn to alter its angle; said stopping means moving down and inward and said springs also shrinking when reaction force between said stopping means and said brake bands becomes greater than the set elasticity of said springs, said stopping means producing a second stage of strong braking action when said stopping means moves down to be stopped by said stop plates of said separator.

* * * * *